US012418802B2

(12) United States Patent
Thantharate et al.

(10) Patent No.: US 12,418,802 B2
(45) Date of Patent: *Sep. 16, 2025

(54) WIRELESS COMMUNICATION NETWORK OPTIMIZATION FOR USER APPLICATIONS IN WIRELESS USER EQUIPMENT (UE)

(71) Applicant: T-MOBILE INNOVATIONS LLC, Overland Park, KS (US)

(72) Inventors: Anurag Thantharate, Kansas City, MO (US); Sreekar Marupaduga, Overland Park, KS (US); Sougata Saha, Olathe, KS (US); Atul Kulkarni, Brambleton, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/327,367

(22) Filed: Jun. 1, 2023

(65) Prior Publication Data

US 2023/0308891 A1 Sep. 28, 2023

Related U.S. Application Data

(63) Continuation of application No. 17/166,127, filed on Feb. 3, 2021, now Pat. No. 11,706,634.

(51) Int. Cl.
*H04W 16/18* (2009.01)
*H04W 4/80* (2018.01)
(Continued)

(52) U.S. Cl.
CPC ............ *H04W 16/18* (2013.01); *H04W 4/80* (2018.02); *H04W 8/205* (2013.01); *H04W 48/18* (2013.01);
(Continued)

(58) Field of Classification Search
CPC ....... H04W 16/18; H04W 4/80; H04W 8/205; H04W 48/18; H04W 76/27; H04W 84/12; H04W 84/18; H04W 48/12
(Continued)

(56) References Cited

U.S. PATENT DOCUMENTS 8,964,595 B2  2/2015  Agarwal et al.
9,693,366 B2  6/2017  Adjakple et al.
(Continued)

FOREIGN PATENT DOCUMENTS

EP    3402254 B1    9/2020
WO   2020091636 A1  5/2020

*Primary Examiner* — Huy C Ho (57) ABSTRACT

A wireless communication device optimizes network communications for a user application. The wireless communication device generates network characteristics for multiple wireless communication networks based wireless signals received from the multiple wireless communication networks. The wireless communication device transfers the network characteristics for the multiple wireless communication networks to the user application. The wireless communication device receives a selection of one of the wireless communication networks from the user application based on the network characteristics. The wireless communication device communicates over a radio with the selected one of the multiple wireless communication networks responsive to the selection from the user application.

20 Claims, 9 Drawing Sheets

(51) Int. Cl.
    *H04W 8/20*     (2009.01)
    *H04W 48/18*     (2009.01)
    *H04W 76/27*     (2018.01)
    *H04W 84/12*     (2009.01)
    *H04W 84/18*     (2009.01)

(52) U.S. Cl.
    CPC .......... *H04W 76/27* (2018.02); *H04W 84/12* (2013.01); *H04W 84/18* (2013.01)

(58) Field of Classification Search
    USPC ....................................................... 370/329
    See application file for complete search history.

(56) References Cited

U.S. PATENT DOCUMENTS

| | | |
|---|---|---|
| 9,924,386 B2 | 3/2018 | Jain et al. |
| 10,212,579 B2 | 2/2019 | Song et al. |
| 10,686,871 B1 | 6/2020 | Taaghol et al. |
| 2003/0100308 A1* | 5/2003 | Rusch ................ H04W 48/18 455/445 |
| 2006/0015636 A1 | 1/2006 | Skraba et al. |
| 2010/0162348 A1 | 6/2010 | Narayanan et al. |
| 2013/0109370 A1 | 5/2013 | Rowson et al. |
| 2017/0150470 A1 | 5/2017 | Kalapatapu et al. |
| 2017/0245316 A1 | 8/2017 | Salkintzis |
| 2017/0302522 A1 | 10/2017 | Tonshal et al. |
| 2018/0359689 A1 | 12/2018 | Lee et al. |
| 2019/0053139 A1 | 2/2019 | Basu Mallick et al. |
| 2019/0373301 A1 | 12/2019 | Gunasekara et al. |
| 2020/0059856 A1* | 2/2020 | Cui ..................... H04W 24/02 |
| 2020/0245160 A1 | 7/2020 | Chu et al. |

* cited by examiner

WIRELESS COMMUNICATION NETWORK OPTIMIZATION FOR USER APPLICATIONS IN WIRELESS USER EQUIPMENT (UE)

RELATED CASES

This United States Patent Application is a continuation of U.S. patent application Ser. No. 17/166,127 that was filed on Feb. 3, 2021 and is entitled "WIRELESS COMMUNICATION NETWORK OPTIMIZATION FOR USER APPLICATIONS IN WIRELESS USER EQUIPMENT (UE)." U.S. patent application Ser. No. 17/166,127 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

The wireless access nodes comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network elements in the network cores. Exemplary network elements include Access and Mobility Management Functions (AMFs), Session Management Functions (SMFs), and User Plane Functions (UPFs).

The wireless user devices comprise user circuitry and wireless network circuitry. The wireless network circuitry has radios and network applications to communicate over the air with the RUs in the wireless access nodes. The user circuitry has an operating system and user applications that use the wireless network circuitry for external data communications. The wireless network circuitry receives and processes wireless signals from the wireless access nodes to develop network characteristics for wireless communication networks. The network characteristics describe wireless network types, wireless signal qualities, Public Land Mobile Network (PLMN) features, wireless network slice parameters, UE antenna configurations, Radio Resource Control (RRC) status, System Information Block (SIB) broadcasts, and the like.

To optimize network communications, a user application in a wireless user device calls its operating system for information that indicates wireless network types and their wireless signal qualities. In response to the call, the operating system transfers a request for the wireless network types and their wireless signal qualities to the wireless network circuitry. The wireless network circuitry responds to the operating system with the wireless network types and their wireless signal qualities. The operating system transfers the wireless network types and their wireless signal qualities to the user application. The user application selects a wireless communication network based on the wireless network types and their wireless signal qualities. The user application then transfers a call to the operating system for the selected wireless communication network. The operating system transfers a request for the selected wireless communication network to the wireless network circuitry. The wireless network circuitry exchanges user data for the user application with the selected wireless communication network.

Unfortunately, the user application does not have access to detailed network characteristics like PLMN features and network slice parameters when selecting its wireless communication networks. Moreover, the user application does not optimize its network communications based on detailed network characteristics like PLMN features and network slice parameters.

TECHNICAL OVERVIEW

In some examples, network communications are optimized for a user application. Network characteristics are generated for multiple wireless communication networks based wireless signals received from the multiple wireless communication networks. The network characteristics for the multiple wireless communication networks are transferred to the user application. A selection of one of the multiple wireless communication networks is received from the user application based on the network characteristics. The selected wireless communication network is communicated with over a radio responsive to the selection from the user application.

In some examples, one or more non-transitory machine-readable storage media stores processing instructions that direct processing circuitry to perform a method to optimize network communications for a user application. The method comprises generating network characteristics for multiple wireless communication networks based wireless signals received from the multiple wireless communication networks. The method comprises transferring the network characteristics for the multiple wireless communication networks to the user application. The method comprises receiving a selection of one of the multiple wireless communication networks from the user application based on the network characteristics. The method comprises communicating over a radio with the selected one of the multiple wireless communication networks responsive to the selection from the user application.

In some examples, a wireless communication device optimizes network communications for a user application. The wireless communication device comprises network circuitry and processing circuitry. The network circuitry wirelessly receives wireless signals from multiple wireless communication networks, and in response, generates network characteristics for the multiple wireless communication networks and transfers the network characteristics for the multiple wireless communication networks to the processing circuitry. The processing circuitry transfers the network characteristics to the user application and responsively receives a selection of one of the one of the multiple wireless communication networks from the user application. The processing circuitry exchanges user data with the user application and the network circuitry. The network circuitry wirelessly exchanges the user data with the selected one of the multiple wireless communication networks.

DETAILED DESCRIPTION

Figure 1:
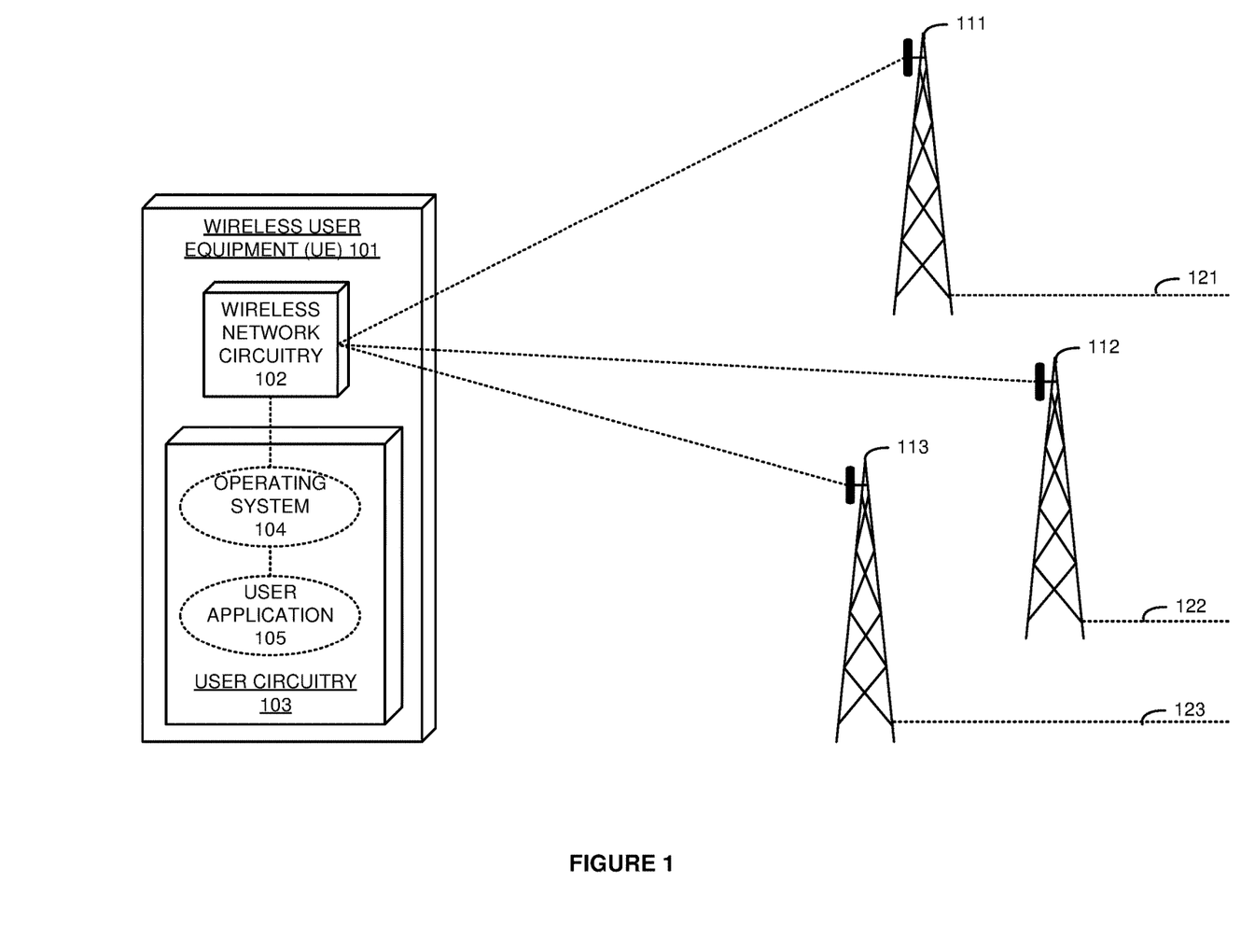
FIG. 1 illustrates a wireless User Equipment (UE) to optimize network communications for user applications.

FIG. 1 illustrates wireless User Equipment (UE) 101 to optimize network communications for user application 105. Wireless UE 101 comprises a computer, phone, vehicle, sensor, robot, or some other data appliance with wireless communication circuitry. Wireless UE 101 consumes wireless data services like internet-access, machine communications, media-conferencing, or some other wireless data product. Wireless UE 101 comprises wireless network circuitry 102 and user circuitry 103. User circuitry 103 comprises operating system 104 and user application 105. Other user applications are typically present and operate like user application 105 but the other user applications are omitted for clarity.

Various examples of UE operation and configuration are described herein. In some examples, operating system 104 receives a user permission for user application 105 to access network characteristics for wireless communication networks 111-113. For example, operating system 104 could direct a graphic display to prompt a human user to permit user application 105 to access network characteristics for networks 111-113 from wireless network circuitry 102. Exemplary network characteristics describe: Public Land Mobile Networks (PLMNs), wireless signal quality, wireless network slices, UE antenna configurations, Radio Resource Control (RRC) status, System Information Block (SIB) broadcasts, and the like. To optimize network communications, user application 105 transfers a call to operating system 104 for the network characteristics. In response to the user permission and the call, operating system 104 transfers a request for the network characteristics to wireless network circuitry 102. Wireless network circuitry 102 receives and processes wireless signals from wireless communication networks 111-113 to generate individual network characteristics for wireless communication networks 111-113. Wireless network circuitry 102 responds to operating system 104 with the individual network characteristics. Operating system 104 transfers the network characteristics to user application 105. User application 105 selects one or more of wireless communication networks 111-113 based on the network characteristics. User application 105 may also select Public Land Mobile Networks (PLMNs) and/or wireless network slices based on the network characteristics. User application 105 transfers a call to operating system 104 for the selected wireless communication networks 111-113, PLMNs, and/or slices. Operating system 104 transfers a request for the selected wireless communication networks 111-113, PLMNs, and/or slices to wireless network circuitry 102. Wireless network circuitry 102 exchanges user data for user application 105 with user circuitry 103. Wireless network circuitry 102 wirelessly exchanges user data for user application 105 with the selected wireless communication networks 111-113 using the selected PLMNs and/or slices.

Advantageously, user application 105 uses detailed network characteristics like PLMN features and network slice parameters to select one or more wireless communication networks. Moreover, user application 105 optimizes its network communications based on the detailed network characteristics like PLMN features and network slice parameters.

UE 101 and RANs 111-113 wirelessly communicate over wireless links using Radio Access Technologies (RATs) like Fifth Generation New Radio (5GNR), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. RANs 111-113 communicate with network cores over backhaul links 121-123 that use metallic links, glass fibers, radio channels, or some other communication media. Links 121-123 use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols. RANs 111-113 are depicted as towers but RANs 111-113 may use other mounting structures or no mounting structures at all. RANs 111-113 may comprise gNodeBs, eNodeBs, NB-IoT access nodes, LP-WAN base stations, wireless relays, and/or some other wireless network transceivers. UE 101 comprises antennas, amplifiers, filters, modulation, analog/digital interfaces, microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless UE 101 and RANs 111-113 as described herein.

Figure 2:
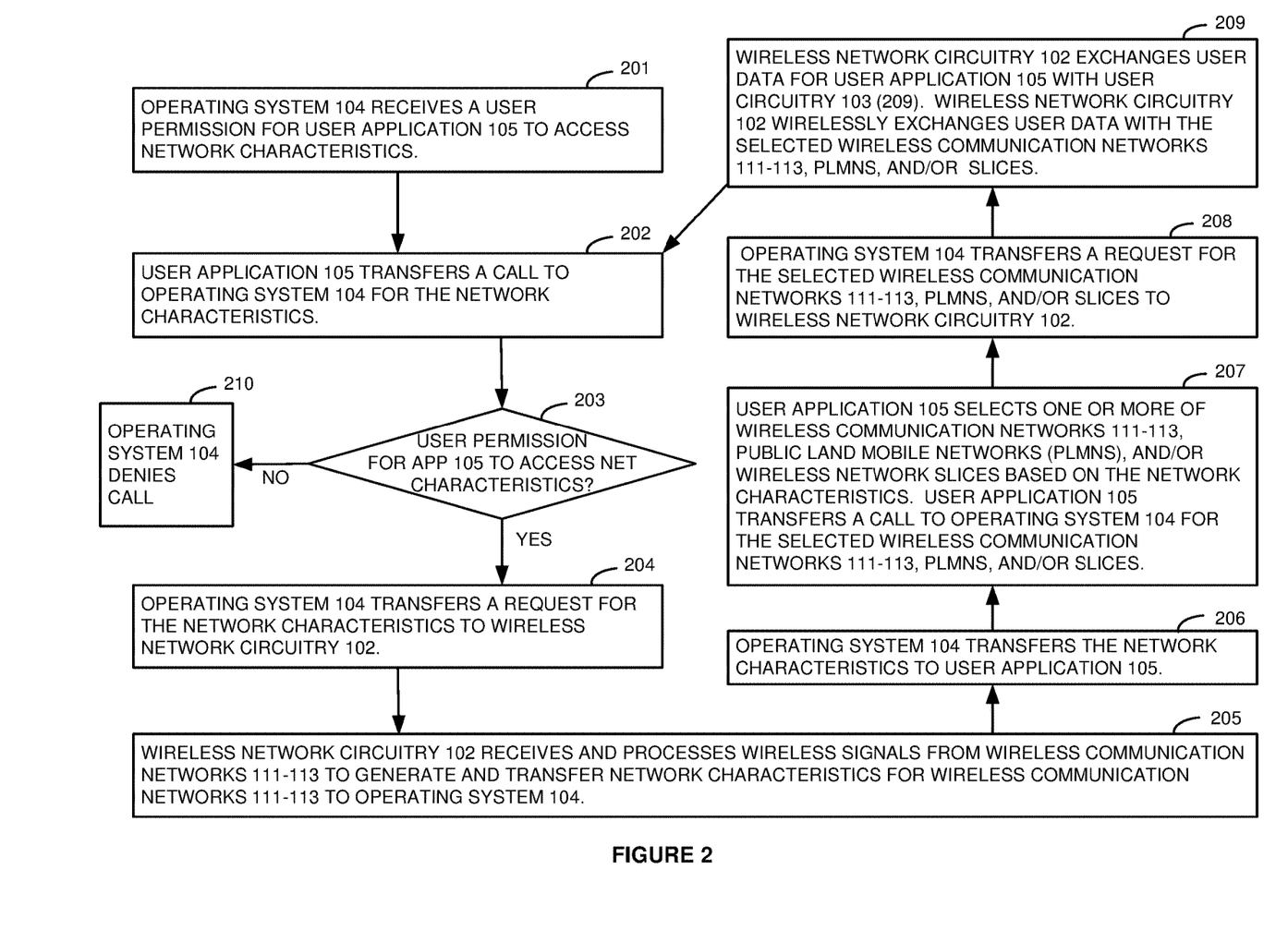
FIG. 2 illustrates the operation of wireless UE to optimize network communications for the user applications.

FIG. 2 illustrates the operation wireless UE 101 to optimize network communications for user application 105. This operation is exemplary and may vary in other examples. Operating system 104 receives a user permission for user application 105 to access network characteristics for wireless communication networks 111-113 (201). To optimize network communications, user application 105 transfers a call to operating system 104 for the network characteristics (202). In response to the user permission and the call (203), operating system 104 transfers a request for the network characteristics to wireless network circuitry 102 (204). Operating system 104 denies the call for the network characteristics from user application 105 when the user permission for from user application 105 is not present (210).

Wireless network circuitry 102 receives and processes wireless signals from wireless communication networks 111-113 to generate and transfer network characteristics for wireless communication networks 111-113 to operating system 104. Operating system 104 transfers the network characteristics to user application 105 (206). User application 105 selects one or more of wireless communication networks 111-113, PLMNs, and/or wireless network slices based on the network characteristics (207). User application 105 transfers a call to operating system 104 for the selected wireless communication networks 111-113, PLMNs, and/or slices (207). Operating system 104 transfers a request for the selected wireless communication networks 111-113, PLMNs, and/or slices to wireless network circuitry 102 (208). Wireless network circuitry 102 exchanges user data for user application 105 with user circuitry 103 (209). Wireless network circuitry 102 wirelessly exchanges user data for user application 105 with the selected wireless communication networks 111-113, PLMNs, and/or slices (209).

Figure 3:
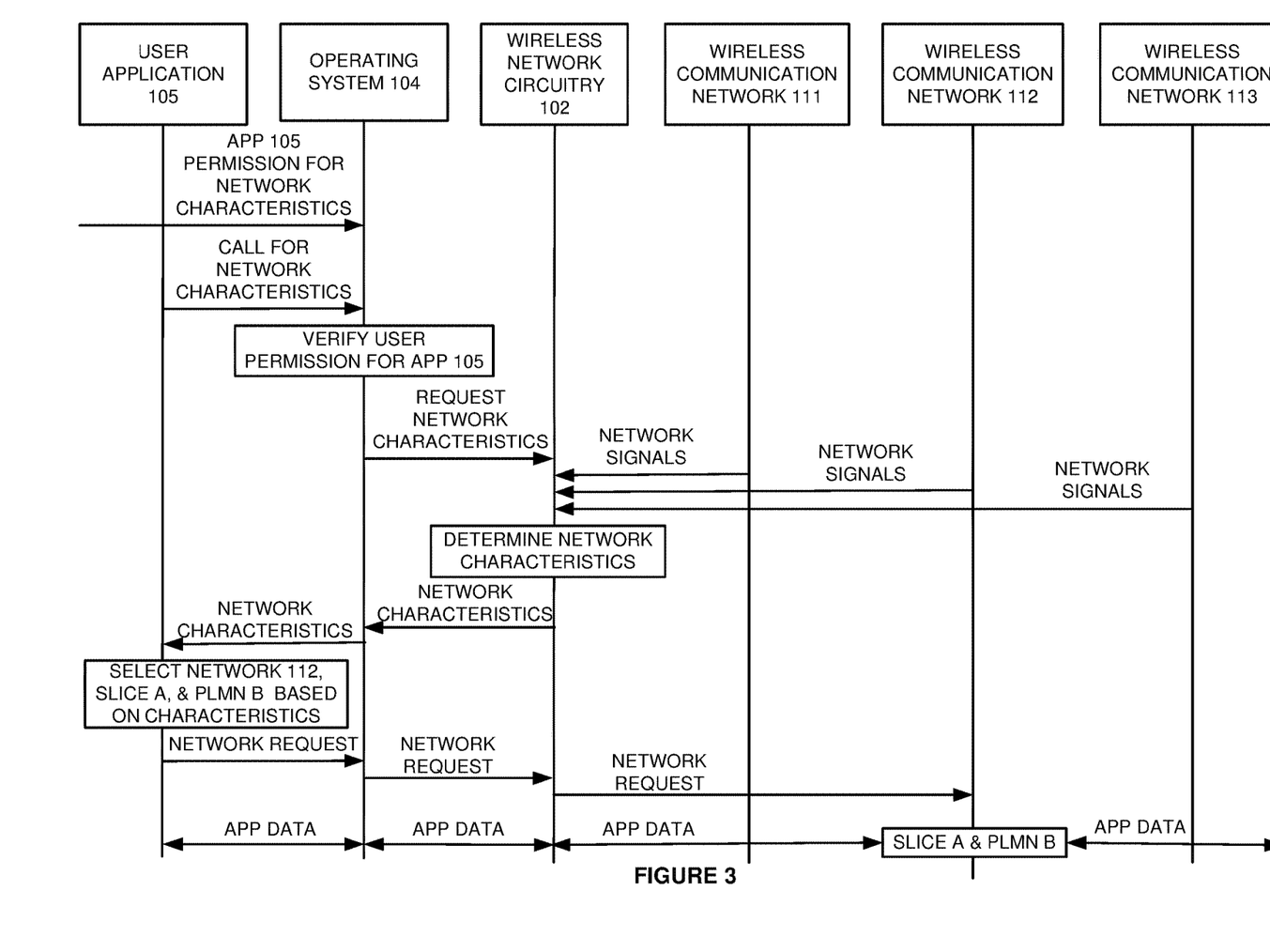
FIG. 3 further illustrates the operation of wireless UE to optimize network communications for the user applications.

FIG. 3 further illustrates the operation wireless UE 101 to optimize network communications for user application 105. This operation is exemplary and may vary in other examples. Operating system 104 receives a user permission for user application 105 to access network characteristics. Exemplary network characteristics comprise information for wireless signal quality, PLMNs, wireless network slices, UE antenna configurations, RRC information, SIB data, and the like. To optimize network communications, user application 105 transfers a call to operating system 104 for the network characteristics. Operating system 104 verifies the user permission for user application 104 to access the network characteristics. In response to the user permission and the call, operating system 104 transfers a request for the network characteristics to wireless network circuitry 102.

Wireless network circuitry 102 receives and processes wireless signals from wireless communication networks 111-113 to generate individual network characteristics for wireless communication networks 111-113. Wireless network circuitry 102 responds to operating system 104 with the individual network characteristics. Operating system 104 transfers the network characteristics to user application 105. In this example, user application 105 selects wireless communication network 112, representative PLMN "A", and representative wireless slice "B" based on the network characteristics. Other selections could be made in other examples. User application 105 transfers a call to operating system 104 for selected wireless communication network 112, PLMN A, and slice B. Operating system 104 transfers a request for wireless communication network 112, PLMN A, and slice B to wireless network circuitry 102. Wireless network circuitry 102 exchanges user data for user application 105 with user circuitry 103. Wireless network circuitry 102 wirelessly exchanges user data for user application 105 with wireless communication network 112 using PLMN A and slice B.

Figure 4:
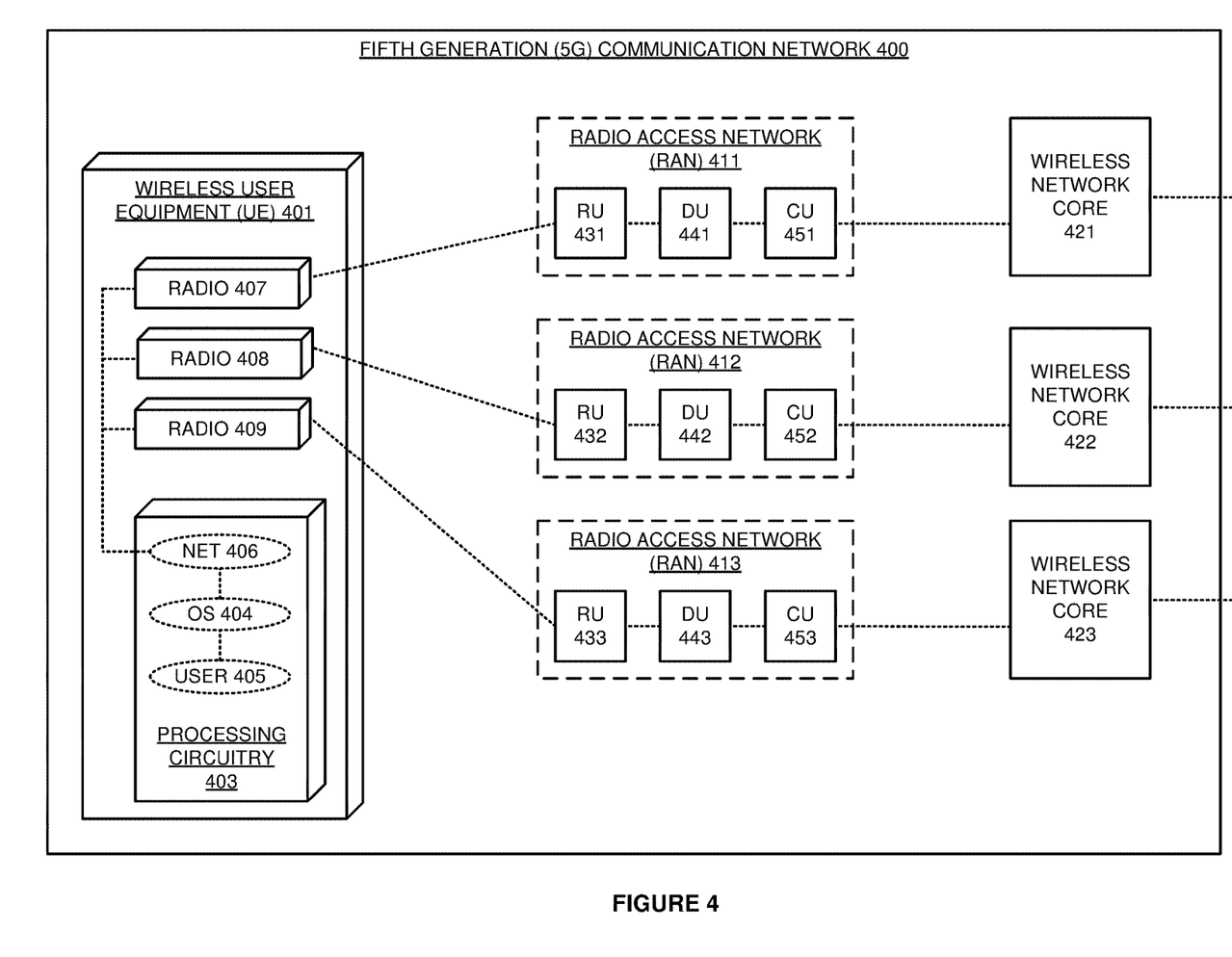
FIG. 4 illustrates a Fifth Generation (5G) UE to optimize network communications for user applications.

FIG. 4 illustrates Fifth Generation (5G) UE 401 to optimize network communications for user application 405. 5G UE 401 comprises an example of UE 101, although UE 101 may differ. UE 401 comprises processing circuitry 403 and radios 407-409. Processing circuitry 403 comprises operating system (OS) 404, user application (USER) 405, and network applications (NET) 406. Radios 407-409 are wirelessly coupled to respective Radio Access Networks (RANs) 411-413 over wireless communication links. RANs 411-413 are coupled to respective wireless network cores 421-423 over backhaul communication links. RANs 411-413 comprise respective Radio Units (RUS) 431-433, Distributed Units (DUs) 441-443, and Centralized Units 451-453.

In wireless UE 401, operating system 404 directs a graphic display to prompt the user and obtain the user's express permission for user application 405 to access network characteristics for RANs 411-413 and network cores 421-423. Operating system 104 receives a user instruction through the display to permit user application 405 to access the network characteristics. The network characteristics comprise radio signal metrics, Public Land Mobile Network (PLMN) features, wireless network slice parameters, UE antenna configurations, Radio Resource Control (RRC) information, System Information Block (SIB) data, and the like. For example, the SIB data may indicate available PLMNs and their network slices along with the features of the PLMNs and slices.

To optimize network communications, user application 405 transfers a call to operating system 404 for the network characteristics. In response to the user permission and the call, operating system 404 transfers a request for the network characteristics to network applications 406. Network applications 406 transfer corresponding requests for the network characteristics to radios 407-409. Radios 407-409 receive and process wireless signals from RANs 411-413 to generate wireless network symbols for RANs 411-413. Radios 407-409 transfer the wireless network symbols for RANs 411-413 to network applications 406. Network applications 406 process the network symbols to recover user data and network signaling. Network applications 406 process the network signaling to generate individual network characteristics for RANs 411-413. Network applications 406 respond to operating system 404 with the individual network characteristics. Operating system 404 transfers the individual network characteristics to user application 405.

User application 405 selects RANs, PLMNs, and/or slices based on the network characteristics. For example, user application 405 may comprise an augmented reality application that selects a specific wireless network slice in a particular PLMN in RAN 413 because that slice has the best latency and mobility for the augmented reality service. In another example, user application 405 may comprise a robot communication application that selects a different wireless network slice in another PLMN in RAN 412 because that slice has the best range and throughput for the robot control service.

In this example, user application 405 selects RAN 411, PLMN A, and wireless network slice B. User application 405 transfers a call to operating system 404 for RAN 411, PLMN A, and slice B. Operating system 404 transfers a request for RAN 411, PLMN A, and slice B to one of network applications 406 that interacts with RAN 411. The network application uses radio 407 to establish wireless data service for UE 401 and user application 405 over RAN 411 using PLMN A and slice B. User application 405 than exchanges user data over operating system 404, network applications 406, radio 407, RAN 411, and wireless network core 421. RAN 411 and wireless network core 421 use PLMN A and wireless network slice B to serve user application 405 in UE 401.

Figure 5:
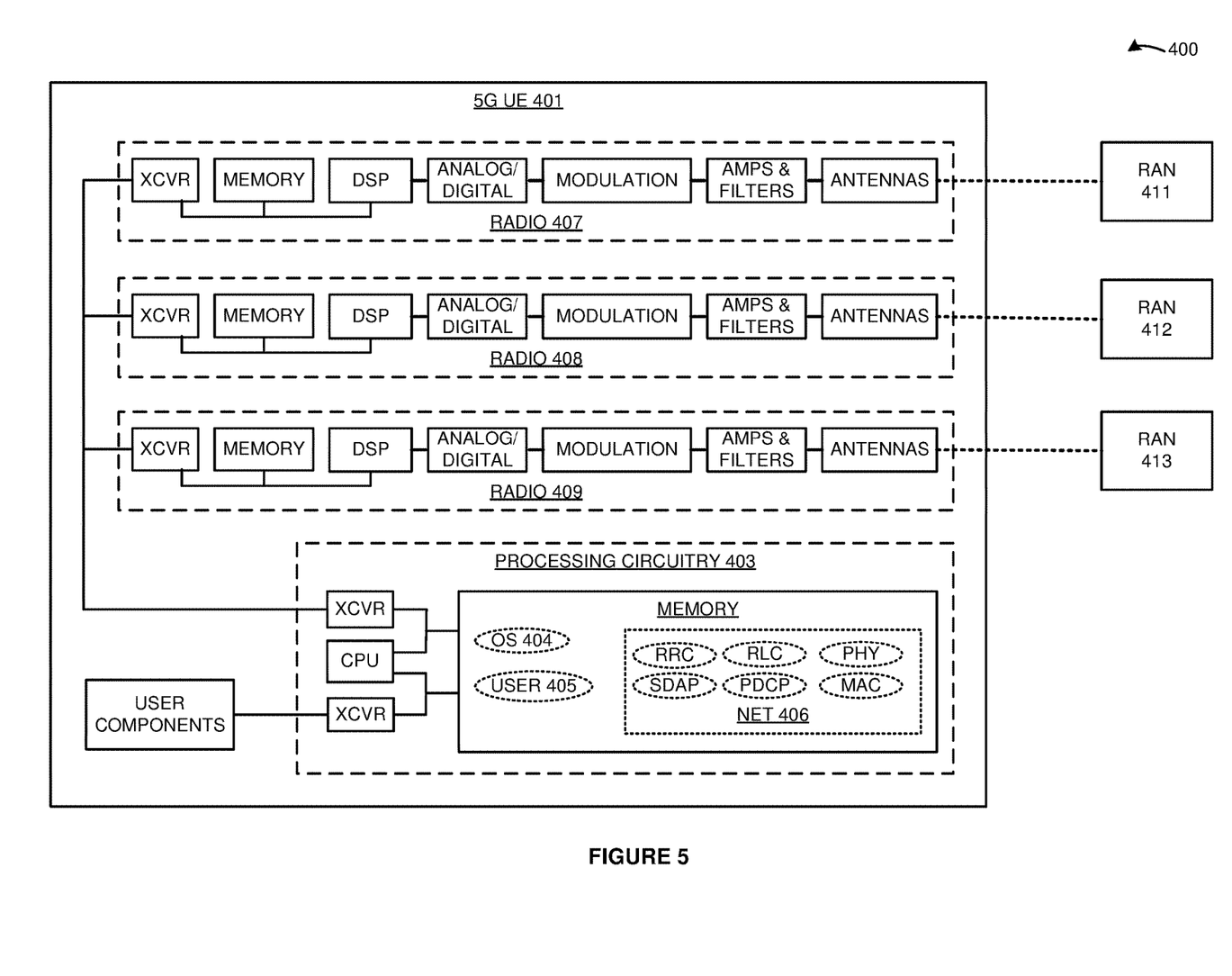
FIG. 5 illustrates the 5G UE which optimizes network communications for the user applications.

FIG. 5 illustrates 5G UE 401 which optimizes network communications for user application 405. UE 401 comprises an example of UE 101, although UE 101 may differ. UE 401 comprises 5GNR radios 407-409 and processing circuitry 403. 5GNR radios 407-409 comprise antennas, amplifiers, filters, modulation, analog-to-digital interfaces, DSP, memory, and transceivers (XCVRs) that are coupled over bus circuitry. Processing circuitry 403 comprises memory, CPU, user interfaces and components, and transceivers that are coupled over bus circuitry. The memory in processing circuitry 403 stores operating system 404, user applications (USER) 404, and network applications (NET) 406. Network applications comprise 5GNR Physical Layer (PHY), Media Access Control (MAC), Radio Link Control (RLC), Packet Data Convergence Protocol (PDCP), Service Data Adaptation Protocol (SDAP), and Radio Resource Control (RRC). The antennas in 5GNR radio 407-409 are wirelessly coupled to respective 5GNR RANs 411-413 over carrier frequency bands. Transceivers in 5GNR radios 407-409 are coupled to transceivers in processing circuitry 403. Transceivers in user circuitry 403 are typically coupled to user components like displays, controllers, and memory. The CPU in processing circuitry 403 executes operating system 404, user applications 405, and network applications 406 to exchange 5GNR signaling and data with 5GNR RANs 411-413 over 5GNR radios 407-409. To correlate UE 401 with UE 101, radios 407-409 and portions of processing circuitry 403 that support network applications 406 represent wireless network circuitry 102, while portions of processing circuitry 403 that support operating system 404 and user applications 405 represent user circuitry 103 in UE 101.

In 5GNR radios 407-409, the antennas receive wireless signals from RANs 411-413 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to processing circuitry 403 over the transceivers. In processing circuitry 403, the CPU executes network applications 406 to process the 5GNR symbols and recover the downlink 5GNR signaling and data. Network applications 406 process the downlink 5GNR signaling to identify individual network characteristics for RANs 411-413. Network applications 406 transfer the downlink user data to user applications 405 over operating system 404.

Network applications 406 receive uplink user data from user applications 405 over operating system 404. Network applications 406 generate new uplink 5GNR signaling for the uplink user data. Network applications 406 process the uplink 5GNR signaling and user data to generate corresponding uplink 5GNR symbols that carry the uplink 5GNR signaling and user data. In 5GNR radios 407-409, the DSP process the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequencies. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 411-413 that transport the uplink 5GNR signaling and user data.

RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Operating system 404 directs a graphic display in the user components to prompt a user and obtain the user's express permission for user application 405 to access network characteristics for RANs 411-413. Operating system 404 receives a user instruction through the display to permit user application 405 to access the network characteristics. The network characteristics comprise radio signal metrics, PLMN features, wireless network slice parameters, UE antenna configurations, RRC information, SIB data, and the like.

To optimize network communications, user application 405 transfers a call to operating system 404 for the network characteristics. In response to the user permission and the call, operating system 404 transfers a request for the network characteristics to the RRCs in network applications 406 for radios 407-409. The RRCs in network applications 406 receive 5GNR symbols over respective radios 407-409 from respective RANs 411-413. The RRCs in network applications 406 processes the symbols to derive the network characteristics for respective RANs 411-413. The RRCs in network applications 406 respond to operating system 404 with the requested network characteristics. Operating system 404 transfers the requested network characteristics to user application 405.

User application 405 selects one or more RANs, PLMNs, and/or wireless network slices based on the network characteristics. In this example, user application 405 selects RAN 411, PLMN A, and wireless network slice B. User application 405 transfers a call to operating system 404 for RAN 411, PLMN A, and slice B. Operating system 404 transfers a request for RAN 411, PLMN A, and slice B to the RRC in network applications 406 that interacts with RAN 411 over radio 407. The RRC in network applications 406 uses radio 407 to establish wireless data service for UE 401 and user application 405 over RAN 411 using PLMN A and slice B. User application 404 then exchanges user data over operating system 404, network application 406, radio 407, and RAN 411. RAN 411 uses PLMN A and wireless network slice B to serve user application 405 in UE 401.

Figure 6:
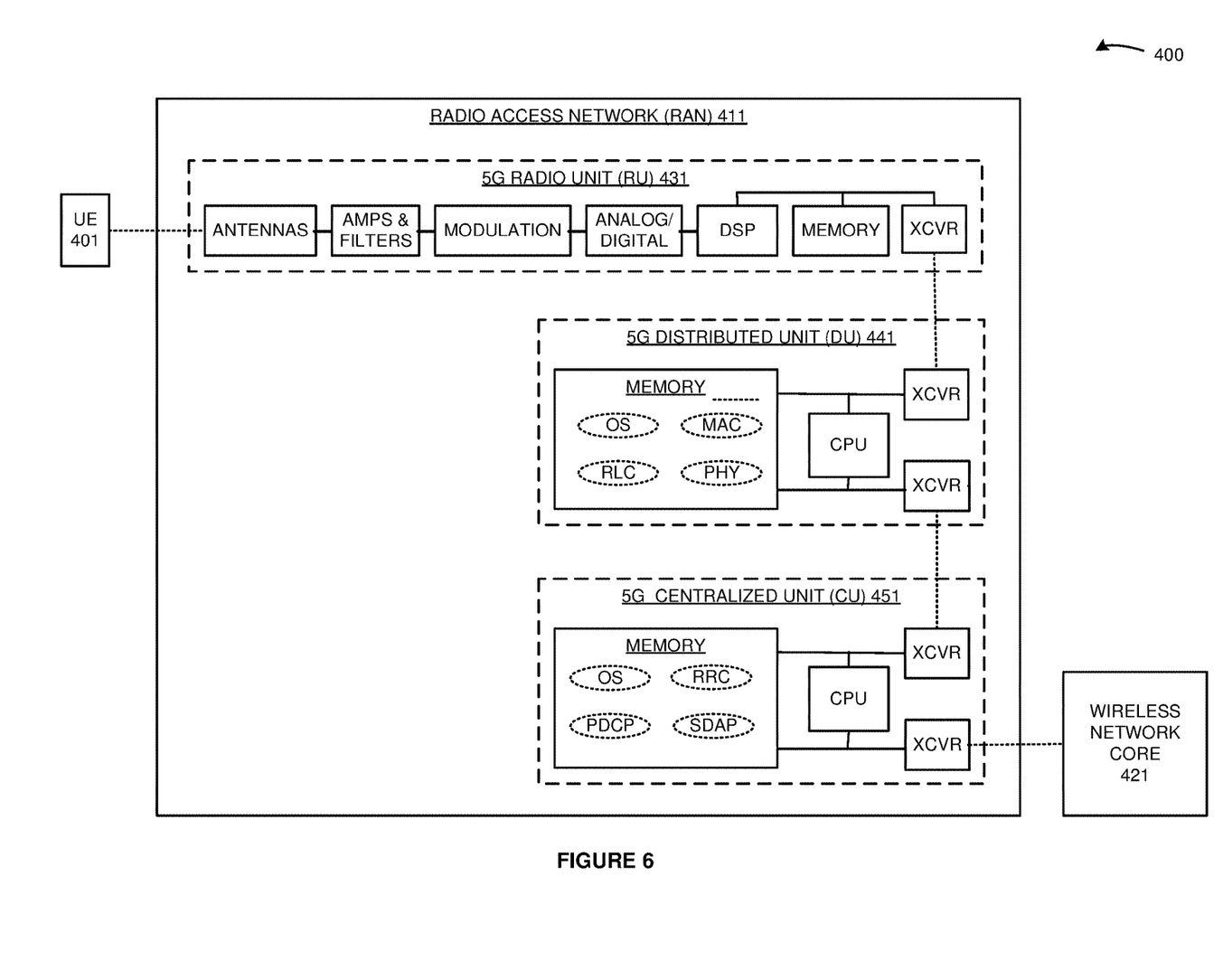
FIG. 6 illustrates a 5G Radio Access Network (RAN) that serves the 5G UE which optimizes network communications for the user applications.

FIG. 6 illustrates 5G Radio Access Network (RAN) 411 that serves 5G UE 410 which optimizes network communications for user application 405. RAN 411 comprises an example of RANs 111-113, although RANs 111-113 may differ. RANs 412 and 413 would be similar to RAN 411. RAN 411 comprises 5G Radio Unit (RU) 431, 5G Distributed Unit (DU) 441, and 5G Centralized Unit (CU) 451. RU 431 comprises antennas, amplifiers, filters, modulation, analog-to-digital interfaces, DSP, memory, and transceivers (XCVRs) that are coupled over bus circuitry. DU 441 comprises memory, CPU, and transceivers that are coupled over bus circuitry. The memory in DU 441 stores operating systems and 5GNR network applications like Physical Layer (PHY), Media Access Control (MAC), and Radio Link Control (RLC). CU 451 comprises memory, CPU, and transceivers that are coupled over bus circuitry. The memory in CU 451 stores an operating system and network applications like Packet Data Convergence Protocol (PDCP), Service Data Adaptation Protocol (SDAP), and Radio Resource Control (RRC).

UE 401 is wirelessly coupled to the antennas in RU 431 over 5GNR links. Transceivers in RU 431 are coupled to transceivers in DU 441 over fronthaul links like enhanced Common Public Radio Interface (eCPRI). Transceivers in DU 441 are coupled to transceivers in CU 451 over mid-haul links. Transceivers in CU 451 are coupled to wireless network core 421 over backhaul links. The DSP in RU 431 executes an operating system and radio applications to exchange 5GNR signals with UE 401 and to exchange 5GNR data units with DU 441. The CPU in DU 441 executes an operating system and PHY, MAC, and RLC to exchange 5GNR data units with RU 431 and to exchange 5GNR data units with CU 451. The CPU in CU 451 executes an operating system and PDCP, SDAP, and RRC to exchange 5G signaling and data with wireless network core 421.

On the uplink, the antennas in RU 431 receive wireless signals from UE 401 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to DU 441 over the transceivers. The PHY, MAC, and RLC in DU 441 process the uplink 5GNR symbols to generate Service Data Units (SDUs) which are transferred to the PDCP in CU 451. In CU 451, the PDCP, SDAP, and RRC process the uplink SDUs and the downlink 5G signaling and data to generate uplink 5G signaling and data and downlink SDUs. The RRC in CU 451 exchanges N2/N1 signaling with network core 421. The SDAP in CU 451 exchanges N3 data network core 421.

On the downlink, the SDAP in CU 451 transfer user data to the PDCP. The PDCP in CU 451 transfers downlink SDUs to the RLC in DU 441. The RLC, MAC, and PHY process the downlink SDUs to generate downlink 5GNR symbols. The PHY in DU 441 transfers the downlink 5GNR symbols to the DSP in RU 431. The DSP receives downlink 5GNR symbols from DU 441. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UE 401 that transport the downlink 5GNR signaling and user data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The RRC in CU 451 receives SIB data from network core 421 that indicates available PLMNs, network slices, and features of the PLMNs and slices. The RRC in CU 451 broadcasts the SIB data over DU 441 and RU 431, and UE 401 receives the wireless broadcast of the SIB data. The RRC in CU 451 receives a service request for PLMN A and slice B from the RRC in UE 401. The RRC in CU 451 transfers the service request for PLMN A and slice B to wireless network core 421 and receives service instructions with UE context. In response to the service instructions, UE 401 and the SDAP in CU 451 exchange user data over RU 431 and DU 441 using PLMN A and slice B. The SDAP in CU 451 and wireless network core 421 exchange user data using PLMN A and wireless network slice B using PLMN A and slice B to serve user application 405 in UE 401.

Figure 7:
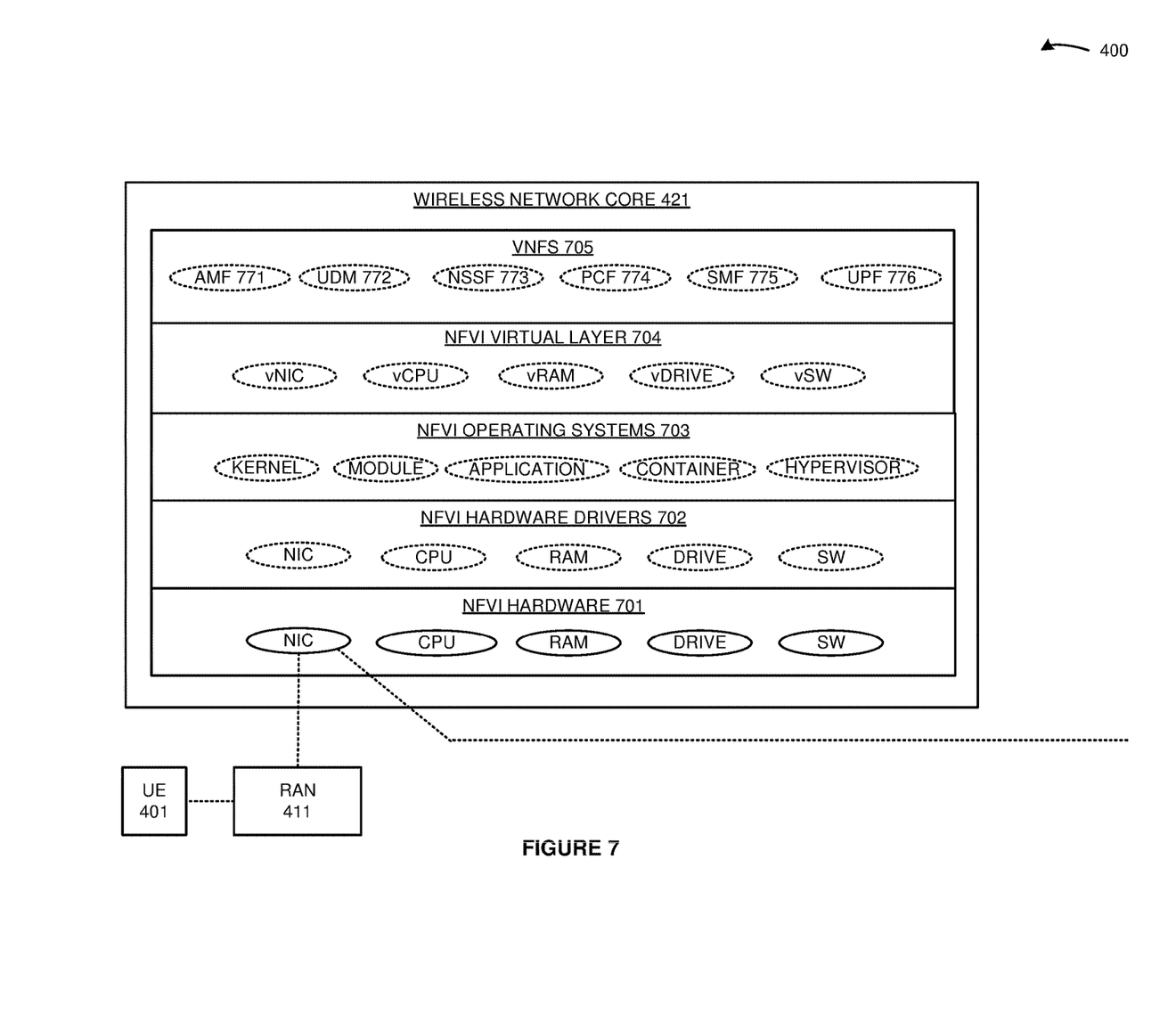
FIG. 7 illustrates a 5G wireless network core that serves the 5G UE which optimizes network communications for the user applications.

FIG. 7 illustrates a wireless network core 421 that serves 5G UE 401 which optimizes network communications for user application 405. Wireless network cores 422-423 could be similar. Wireless network core 421 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise Access and Mobility Management Function (AMF) 771, Uniform Data Management (UDM) 772, Network Slice Selection Function (NSSF) 773, Policy Control Function (PCF) 774, Session Management Function (SMF) 775, and User Plane Function (UPF) 776. Other VNFs like Authentication Server Function (AUSF) and Network Repository Function (NRF) are typically present but are omitted for clarity. Wireless network core 421 may be located at a single site or be distributed across multiple geographic locations. The NIC in NFVI hardware 701 are coupled to RAN 411 and to external systems. NFVI hardware 701 executes NFVI hardware drivers 702, NFVI operating systems 703, NFVI virtual layer 704, and NFVI VNFs 705 to serve UE 401 over RAN 411.

Figure 8:
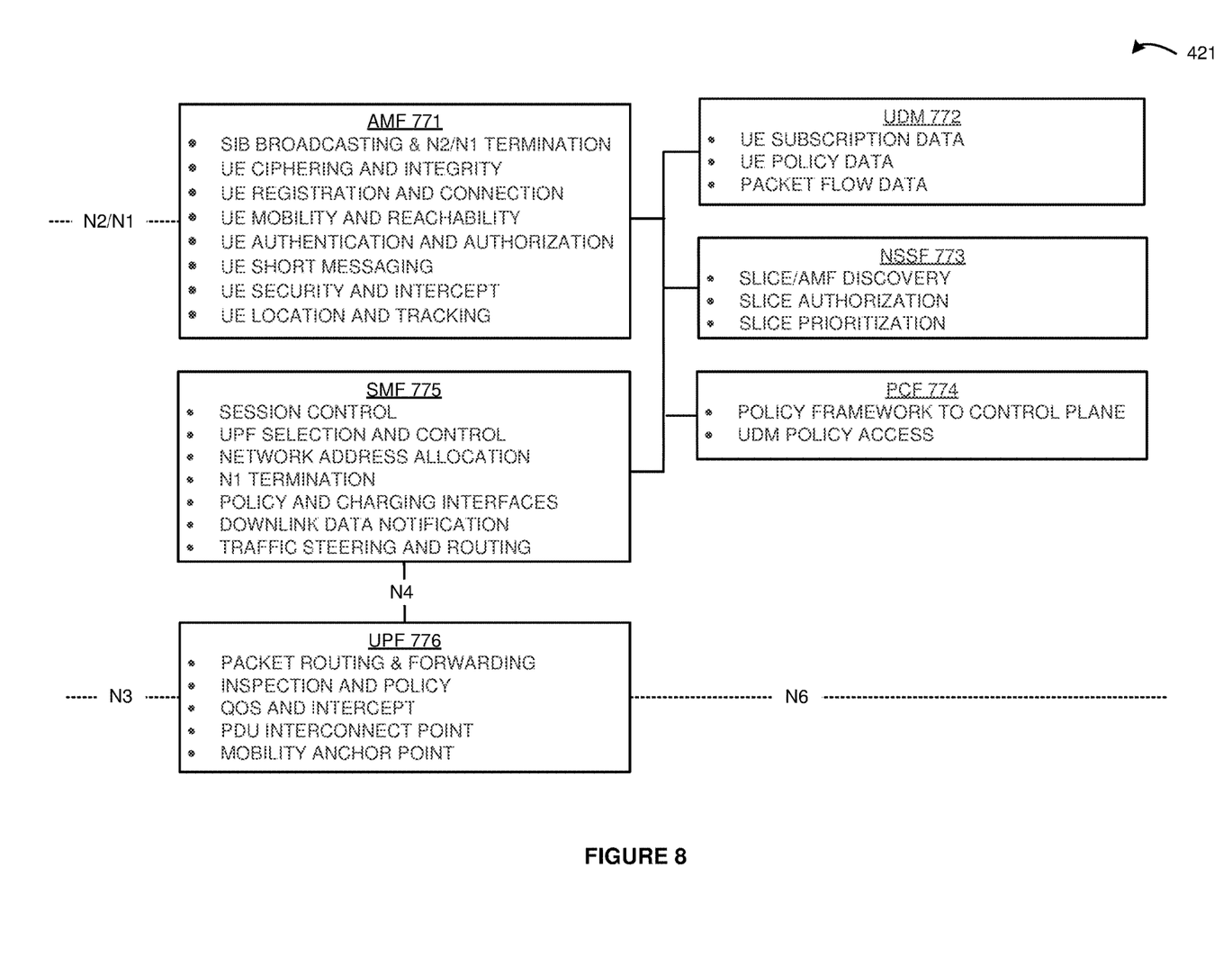
FIG. 8 further illustrates the 5G wireless network core that serves the 5G UE which optimizes network communications for the user applications.

FIG. 8 further illustrates 5G wireless network core 421 that serves 5G UE 401 which optimizes network communications for user application 405. AMF 771 performs SIB broadcasting, N2/N1 termination, N1 ciphering & integrity protection, UE registration. SMF/PCF selection, UE connection/mobility management. UE authentication and authorization, UE security management, and tracking area updates. User Data Management (UDM) 772 handles UE context, UE subscription data, and UE authentication keys. NSSF 773 performs slice discovery, AMF discovery, slice authorization, and slice prioritization. Policy Control Function (PCF) 774 distributes UE policies to the control plane based on network function. SMF 775 performs session establishment/management, network address allocation. N1 termination, downlink data notification, and traffic steering and routing. UPF 776 performs packet routing & forwarding, packet inspection, QoS handling, PDU interconnection, and mobility anchoring.

AMF 771 receives attachment signaling for UE 401 from RAN 411 that requests PLMN A and slice B. AMF 771 interacts with UDM 772 to authenticate UE 401 and authorize PLMN A. AMF 771 interacts with NSSF 773 to authorize slice B. AMF 771, PCF 774, and SMF 775 interact to select the remaining UE context for the wireless data service for UE 401. AMF 771 directs RAN 411 to serve UE 401 per the UE context which includes PLMN A and slice B. SMF 775 directs UPF 776 to serve UE 401 per the UE context which includes PLMN A and slice B. RAN 411 and UPF 776 serve UE 401 per the UE context by using PLMN A and slice B.

Figure 9:
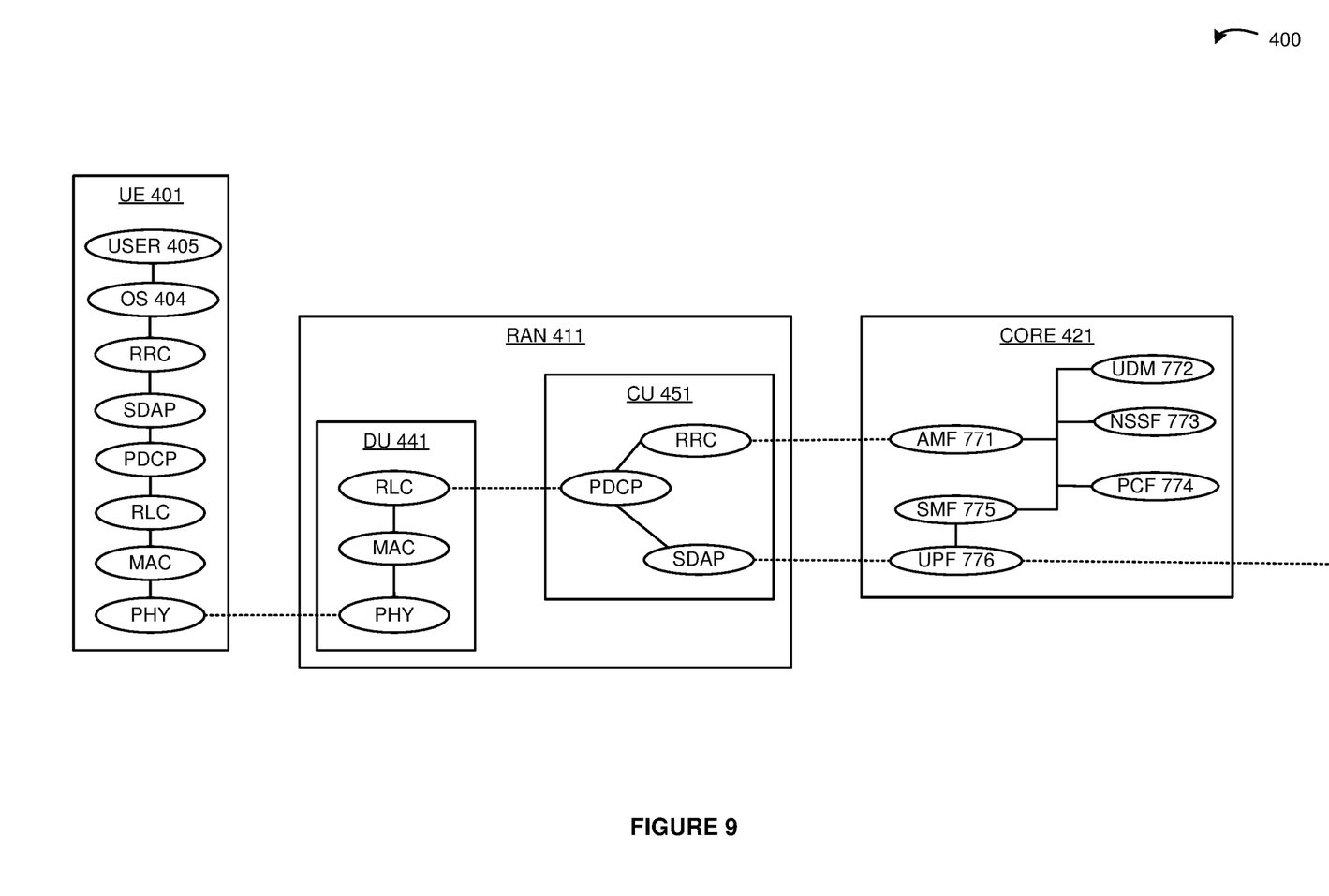
FIG. 9 illustrates the operation of the 5G UE to optimize network communications for the user applications.

FIG. 9 illustrates the operation of 5G UE 401 to optimize network communications for user application 405. The operation is exemplary and may vary in other examples. In wireless UE 401, operating system 404 directs a graphic display to prompt a user to obtain the user's express permission for user application 405 to access network characteristics for RANs 411-413. Operating system 104 receives a user instruction through the display to permit user application 405 to access the network characteristics. The network characteristics comprise radio signal metrics, PLMN features, wireless network slice parameters, UE antenna configurations, RRC information, SIB data, and the like. For example, the RRC data may indicate received signal power and interference metrics for RANs 411-413.

To optimize network communications, user application 405 transfers a call to operating system 404 for the network characteristics. In response to the user permission and the call, operating system 404 transfers a request for the network characteristics to the RRC for radio 407. The operation of the RRC for radios 408-409 is similar. The PHY in UE 401 detects the network characteristics from the downlink symbols provided by radio 407 and transfers the network characteristics to the RRC. The RRC responds to operating system 404 with the network characteristics. Operating system 404 transfers the network characteristics to user application 405.

User application 405 selects one or more of RANs 411-413, wireless network slices, and/or PLMNs based on the network characteristics. In this example, user application 405 selects RAN 411, PLMN A, and wireless network slice B. User application 405 transfers a call to operating system 404 for RAN 411, PLMN A, and slice B. Operating system 404 transfers a request for RAN 411, PLMNs A, and slice B to the RRC that interacts with RAN 411. The RRC in UE 401 exchanges signaling with the RRC in CU 451 to establish the wireless data service using PLMN A and slice B. The RRC in UE 401 exchanges signaling with the AMF 771 in core 421 to establish the wireless data service using PLMN A and slice B. AMF 771 interacts with UDM 772 to authenticate UE 401 and authorize PLMN A for UE 401. AMF 771 interacts with NSSF 772 to authorize slice B for UE 401. AMF 771, PCF 774, and SMF 775 interact to select the remaining UE context like QoS and network addresses for the wireless data service over PLMN A and slice B. AMF 771 directs the RRC in CU 451 to serve UE 401 per the UE context. SMF 775 directs UPF 776 to serve UE 401 per the UE context.

In UE 401, user application 405 exchanges user data with operating system 404, and operating system 404 exchanges the user data with the SDAP for radio 407. The SDAP for radio 407 and the SDAP in CU 451 exchange the user data per the UE context which requires PLMN A and slice B. The SDAP in CU 451 and UPF 776 exchange the user data per the UE context using PLMN A and slice B. UPF 776 exchanges the user data with external systems per the UE context using PLMN A and slice B.

The wireless data network circuitry described above comprises computer hardware and software that form special-purpose UE circuitry to optimize network communications for user applications. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose UE circuitry to optimize network communications for user applications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method to optimize network communications for a user application, the method comprising:
generating network characteristics for multiple wireless communication networks based wireless signals received from the multiple wireless communication networks, wherein the network characteristics comprise one or more network slice parameters for network slices associated with the multiple wireless communication networks;
transferring the network characteristics that include the one or more network slice parameters for the multiple wireless communication networks to the user application;
receiving a selection of one of the multiple wireless communication networks from the user application based on the network characteristics that include the one or more network slice parameters; and
communicating over a radio with the selected one of the multiple wireless communication networks responsive to the selection from the user application.

2. The method of claim 1 wherein the wireless signals received from the multiple wireless communication networks comprise System Information Blocks (SIBs).

3. The method of claim 1 wherein the wireless signals received from the multiple wireless communication networks comprise Public Land Mobile Network (PLMN) information.

4. The method of claim 1 wherein:
receiving the selection of the one of the wireless communication networks from the user application comprises receiving an indication of a wireless network slice in the one of the wireless communication networks; and
communicating over the radio with the selected one of the multiple wireless communication networks comprises communicating with the wireless network slice in the selected one of the multiple wireless communication networks.

5. The method of claim 1 wherein:
receiving the selection of the one of the wireless communication networks from the user application comprises receiving an indication of a Public Mobile Land Network (PLMN) in the one of the wireless communication networks; and
communicating over the radio with the selected one of the multiple wireless communication networks comprises communicating with the PLMN in the selected one of the multiple wireless communication networks.

6. The method of claim 1 wherein:
receiving the selection of the one of the wireless communication networks from the user application comprises receiving an indication of a Radio Access Technology (RAT) in the one of the wireless communication networks; and
communicating over the radio with the selected one of the multiple wireless communication networks comprises wirelessly communicating with the RAT in the selected one of the multiple wireless communication networks.

7. The method of claim 1 wherein:
transferring the network characteristics for the multiple wireless communication networks to the user application comprises an operating system receiving an operating system call for the network characteristics from the user application and the operating system transferring the network characteristics for the multiple wireless communication networks to the user application in response to the operating system call; and
receiving the selection of the one of the multiple wireless communication networks from the user application comprises the operating system receiving another operating system call from the user application to use the selected one of the multiple wireless communication networks.

8. One or more non-transitory machine-readable storage media that stores processing instructions that direct processing circuitry to perform a method to optimize network communications for a user application, the method comprising:
generating network characteristics for multiple wireless communication networks based wireless signals received from the multiple wireless communication networks, wherein the network characteristics comprise one or more network slice parameters for network slices associated with the multiple wireless communication networks;
transferring the network characteristics that include the one or more network slice parameters for the multiple wireless communication networks to the user application;
receiving a selection of one of the multiple wireless communication networks from the user application based on the network characteristics that include the one or more network slice parameters; and
communicating over a radio with the selected one of the multiple wireless communication networks responsive to the selection from the user application.

9. The one or more non-transitory machine-readable storage media of claim 8 wherein the wireless signals received from the multiple wireless communication networks comprise System Information Blocks (SIBs).

10. The one or more non-transitory machine-readable storage media of claim 8 wherein the wireless signals received from the multiple wireless communication networks comprise Public Land Mobile Network (PLMN) information.

11. The one or more non-transitory machine-readable storage media of claim 8 wherein:
receiving the selection of the one of the wireless communication networks from the user application comprises receiving an indication of a wireless network slice in the one of the wireless communication networks; and
communicating over the radio with the selected one of the multiple wireless communication networks comprises communicating with the wireless network slice in the selected one of the multiple wireless communication networks.

12. The one or more non-transitory machine-readable storage media of claim 8 wherein:
receiving the selection of the one of the wireless communication networks from the user application comprises receiving an indication of a Public Mobile Land Network (PLMN) in the one of the wireless communication networks; and
communicating over the radio with the selected one of the multiple wireless communication networks comprises communicating with the PLMN in the selected one of the multiple wireless communication networks.

13. The one or more non-transitory machine-readable storage media of claim 8 wherein:

receiving the selection of the one of the wireless communication networks from the user application comprises receiving an indication of a Radio Access Technology (RAT) in the one of the wireless communication networks; and communicating over the radio with the selected one of the multiple wireless communication networks comprises wirelessly communicating with the RAT in the selected one of the multiple wireless communication networks.

14. The one or more non-transitory machine-readable storage media of claim 8 wherein:

transferring the network characteristics for the multiple wireless communication networks to the user application comprises an operating system receiving an operating system call for the network characteristics from the user application and the operating system transferring the network characteristics for the multiple wireless communication networks to the user application in response to the operating system call; and receiving the selection of the one of the multiple wireless communication networks from the user application comprises the operating system receiving another operating system call from the user application to use the selected one of the multiple wireless communication networks.

15. A wireless communication device to optimize network communications for a user application, the wireless communication device comprising:

network circuitry configured to wirelessly receive wireless signals from multiple wireless communication networks, and in response, to generate network characteristics for the multiple wireless communication networks and transfer the network characteristics for the multiple wireless communication networks to processing circuitry, wherein the network characteristics comprise one or more network slice parameters for network slices associated with the multiple wireless communication networks;

the processing circuitry configured to transfer the network characteristics that include the one or more network slice parameters to the user application and responsively receive a selection of one of the one of the multiple wireless communication networks from the user application based on the network characteristics that include the one or more network slice parameters;

the processing circuitry further configured to exchange user data with the user application and with the network circuitry; and the network circuitry further configured to wirelessly exchange the user data with the selected one of the multiple wireless communication networks.

16. The wireless communication device of claim 15 wherein the wireless signals comprise System Information Blocks (SIBs).

17. The wireless communication device of claim 15 wherein the wireless signals comprise Public Land Mobile Network (PLMN) information.

18. The wireless communication device of claim 15 wherein:

the processing circuitry is configured to receive the selection of the one of the wireless communication networks comprises the processing circuitry configured to receive an indication of a wireless network slice in the one of the wireless communication networks; and the network circuitry is configured to wirelessly exchange the user data with the selected one of the multiple wireless communication networks comprises the network circuitry configured to wirelessly exchange the user data with the wireless network slice in the selected one of the multiple wireless communication networks.

19. The wireless communication device of claim 15 wherein:

the processing circuitry is configured to receive the selection of the one of the wireless communication networks comprises the processing circuitry configured to receive an indication of a Public Mobile Land Network (PLMN) in the one of the wireless communication networks; and the network circuitry is configured to wirelessly exchange the user data with the selected one of the multiple wireless communication networks comprises the network circuitry configured to wirelessly exchange the user data with the PLMN in the selected one of the multiple wireless communication networks.

20. The wireless communication device of claim 15 wherein:

the processing circuitry is configured to transfer the network characteristics for the multiple wireless communication networks to the user application comprises an operating system in the processing circuitry configured to receive an operating system call for the network characteristics from the user application and the operating system in the processing circuitry to transfer the network characteristics for the multiple wireless communication networks to the user application in response to the operating system call; and the processing circuitry is configured to receive the selection of the one of the multiple wireless communication networks from the user application comprises the operating system configured to receive another operating system call from the user application to use the selected one of the multiple wireless communication networks.

* * * * *